United States Patent [19]
Tretter

[11] 4,054,838
[45] Oct. 18, 1977

[54] QAM PHASE JITTER AND FREQUENCY OFFSET CORRECTION SYSTEM

[75] Inventor: Steven Alan Tretter, Silver Spring, Md.

[73] Assignee: Rixon, Inc., Silver Spring, Md.

[21] Appl. No.: 678,431

[22] Filed: Apr. 19, 1976

[51] Int. Cl.² .............................................. H04L 5/12
[52] U.S. Cl. ...................................... 325/323; 325/473
[58] Field of Search ................ 325/42, 320, 329, 418, 325/419, 420, 421, 423, 60, 63, 473; 329/122, 124; 328/133, 155

[56] References Cited

U.S. PATENT DOCUMENTS

| | | | |
|---|---|---|---|
| 3,701,023 | 10/1972 | Fang | 325/329 |
| 3,800,228 | 3/1974 | Acker | 325/42 |

*Primary Examiner*—Benedict V. Safourek
*Attorney, Agent, or Firm*—Larson, Taylor and Hinds

[57] ABSTRACT

A system is provided for correcting phase jitter and frequency offsets in QAM modems. The system comprises (i) a narrow bandwidth, decision directed, phase-locked loop for tracking the average phase and frequency offsets followed by (ii) a phase jitter corrector located outside of the loop. The phase error signal for the jitter corrector is produced by passing the phase error signal of the phase-locked loop through a low pass filter designed to pass the expected jitter frequencies. Inphase and quadrature signals from the loop are delayed to compensate for the delay of the low pass filter, and the delayed signals, together with the filter output, are applied to a phase shifter which provides phase jitter correction using a rotational transformation.

4 Claims, 2 Drawing Figures

QAM PHASE JITTER AND FREQUENCY OFFSET CORRECTION SYSTEM

FIELD OF THE INVENTION

The present invention relates to QAM modems and, more particularly, to a phase jitter and frequency offset correction system for QAM modems.

BACKGROUND OF THE INVENTION

Two common forms of distortion in digital data transmission systems are phase jitter and frequency offset. Phase jitter is a time-varying shift in the instantaneous phase of a modulated signal and is usually repetitive in some systematic manner. Frequency offset occurs when the modulating and demodulating carriers differ in frequency.

A number of techniques have been developed for combatting phase jitter and frequency offset. For example, where the demodulating carrier is derived from a pilot frequency transmitted over the transmission line, no frequency offset occurs, although the received waveform may be quite different from the transmitted waveform since the phase of the carrier is not adjusted. The reader is referred to U.S. Pat. No. 3,813,598 (Stuart) which discloses a carrier recovery system which utilizes a single pilot tone. Reference is also made to U.S. Pat. No. 3,849,730 (Ho) which likewise deals with the problems of phase jitter and frequency offset in a vestigial sideband amplitude modulation system. The Ho system employs a quadrature pilot tone added to the transmitted data signal. At the receiver, the carrier frequency, frequency offsets and phase jitter are estimated from the pilot tone which is separated from the data signal using a quadrature demodulator and associated circuitry. The requirement of a pilot tone has obvious disadvantages.

SUMMARY OF THE INVENTION

According to the present invention, a system is provided for correcting phase jitter and carrier frequency offsets in QAM systems wherein no pilot tone is transmitted. In contrast to the systems of the Stuart and Ho patents discussed above, the phase jitter and carrier frequency offsets are recovered directly from the received signal thus avoiding the waste of power on an unnecessary pilot tone and the resulting loss in error rate performance.

Generally speaking, the present invention involves the use of a narrow bandwidth, decision directed, phase-locked loop for tracking the average phase and frequency offsets in combination with a jitter corrector located outside of the phase-locked loop. The phase jitter is estimated from the error signal generated by the phase-locked loop, which error signal is applied to a low pass filter designed to pass the expected jitter frequencies. The inphase and quadrature outputs of the phase-locked loop are delayed to compensate for the delay produced by the low pass filter and all of these signals, viz., the output of the low pass filter and the delayed inphase and quadrature signals, are applied to a phase shifter wherein the effects of the phase jitter are taken out by rotational transformation. The decision directed phase-locked loop corrects for frequency offsets.

Other features and advantages of the invention will be set forth in, or apparent from, the detailed description of a preferred embodiment found hereinbelow.

DESCRIPTION OF THE PREFERRED EMBODIMENTS

Figure 1:
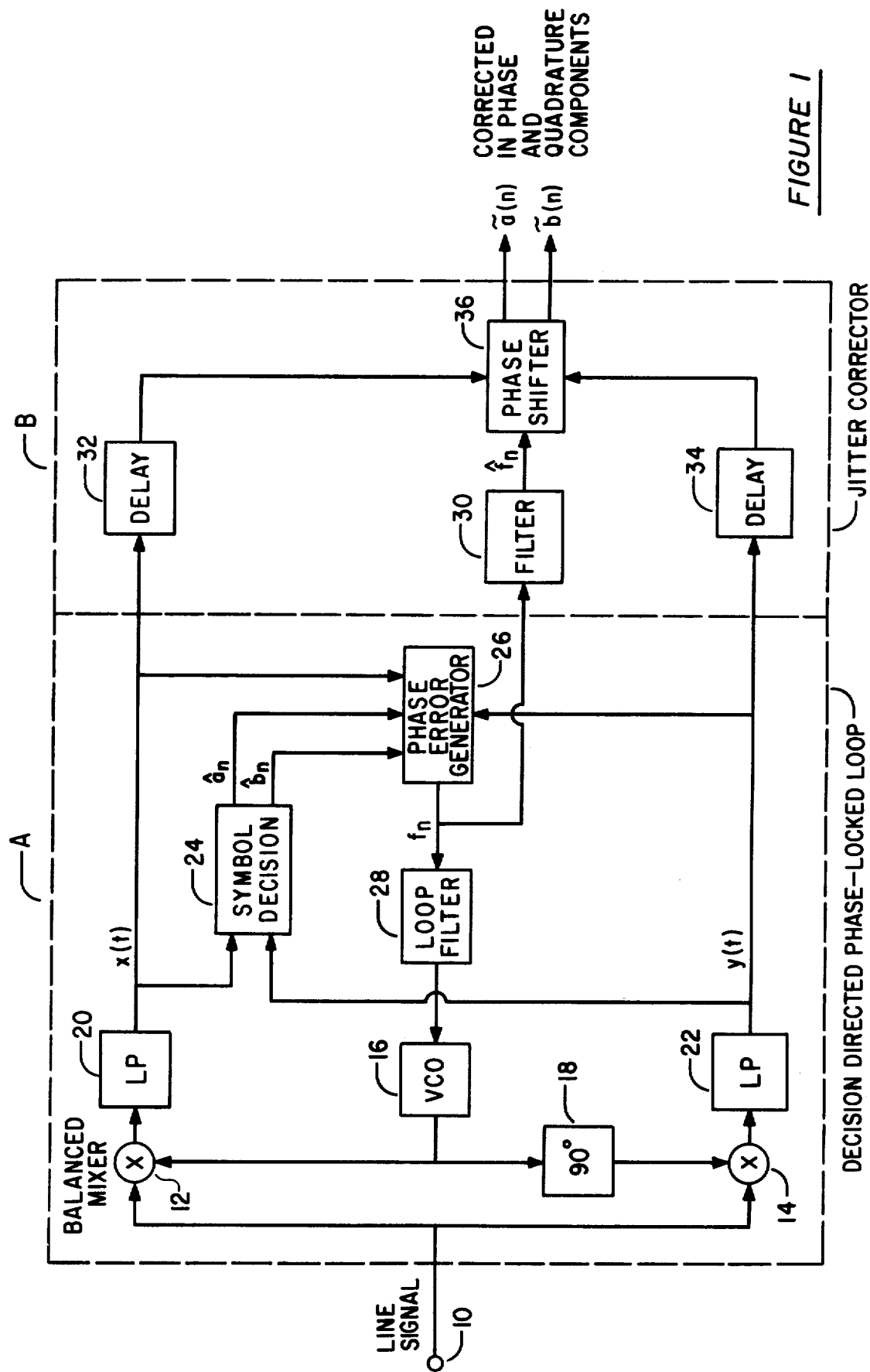
FIG. 1 is a schematic circuit diagram, in block form, of a preferred embodiment of a system for correcting phase jitter and frequency offsets in QAM modems, in accordance with the invention.

Before discussing the system shown in the drawings, the nature of the transmitted and received signals will be considered. The transmitted signal in a QAM system can be expressed as:

$$s(t) = \sum_n a_n h(t - nT) \cos \omega_o t - \sum_n b_n h(t - nT) \sin \omega_o t$$

where T is the baud duration, $\omega_0$ is the carrier frequency, and $h(t)$ is the impulse response of the transmitter shaping filter. The signal $$a(t) = \sum_n a_n h(t - nT)$$

is normally referred to as the inphase component of $s(t)$ and $$b(t) = \sum_n b_n h(t - nT)$$

is normally referred to as the quadrature component of $s(t)$. The pairs $(a_n, b_n)$ can take on $2^k$ descrete values where k is the number of data bits transmitted per baud. Any two-dimensional signal sets can be generated by QAM modulation. Typical examples are phase modulation, combined amplitude and phase modulation, and signal points at the vertices of rectangular grids.

The equivalent low-pass complex representation for $s(t)$ is $$c(t) = a(t) + jb(t)$$

By direct computation it can be seen that $$s(t) = Re\{c(t) e^{j\omega_o t}\}$$

Assuming that the transmitter shaping filter causes no intersymbol interference, the samples of $c(t)$ are $$c(nT) = a(nT) + jb(nT) = a_n + jb_n$$

The complex representation will be used in the remainder of this disclosure.

Assuming that the channel has no amplitude or delay distortion, the received signal can be represented as $$r(t) = c(t) e^{jp(t)} + w(t)$$

where $p(t)$ is the sum of the channel frequency offset and phase jitter, and $w(t)$ represents additive noise.

Referring now to the drawings, the system illustrated basically comprises a decision directed phase-locked loop indicated within dashed line block A and a jitter corrector indicated within dashed line block B. The line signal enters the system at an input terminal 10 which is connected to first and second balanced mixers 12 and 14. Balanced mixer 12 is directly connected to a voltage controlled oscillator (VCO) 16 while mixer 14 is connected to VCO 16 through a 90° phase shift network 18. The outputs of mixers 12 and 14 are passed through corresponding low pass filters 20 and 22 so as to obtain the inphase component $x(t)$ and the quadrature component $y(t)$ of the received signal, respectively. In complex notation this demodulation process can be expressed by the relationships:

$$v(t) = x(t) + jy(t) = r(t)e^{-jB(t)}$$

where B is the phase of the output of VCO.

The output signals $x(t)$ and $y(t)$ from low pass filters 20 and 22 are sampled at the time $nT$ and a symbol decision circuit 24 connected to filters 20, 22 selects the most likely transmitted symbol. The output of symbol decision circuit 24 is a pair of signals $\hat{a}_n$ and $\hat{b}_n$. The output of symbol decision network 24, along with the outputs of filters 20 and 22, are connected to a phase error generator 26 which generates a phase error signal $f_n$ of the form $$f_n = Im \{(\hat{a}_n + j\hat{b}_n) \overline{v(nT)}/|(\hat{a}_n + j\hat{b}_n) \overline{v(nT)}|\} = \sin\Delta_n$$

where $\Delta_n$ is the noise corrupted phase error at the time $nT$. When the loop is tracking well, the value of $\Delta_n$ is small and $$f_n = \sin\Delta_n = \Delta_n$$

The output of phase error generator 26 is passed through a low pass loop filter 28 and applied to VCO 16. The bandwidth of loop filter 28 is made small so that the loop including VCO 16 tracks the average phase offset but does not respond to the channel phase jitter. The loop filter 28 is also chosen so that the frequency offsets are tracked. Under these conditons, the output $f_n$ of phase error generator 26 is a noisy estimate of the channel phase jitter.

At this point, it should be noted that decision directed phase-locked loops are conventional and are described in a number of journal articles and textbooks. Reference is made, for example, to U.S. Pat. No. 3,806,815 (Fletcher et al.) for an example decision directed feedback loop.

Turning now to a consideration of the jitter corrector portion of the system illustrated, the output of phase error generator 26 is connected to a low pass digital filter 30 to eliminate noise. The bandwidth of digital filter 30 is chosen such that the expected phase jitter frequencies are passed thereby. Suitable digital filters are described in the patent and nonpatent literature. The outputs of low pass filters 20 and 22 are connected to delay networks 32 and 34, respectively, which delay the inphase samples $x(NT)$ and quadrature samples $y(nT)$ so as to match the delay of digital filter 30.

The outputs of delay networks 32 and 34 are connected to a phase shifter 36 which corrects the phase error by performing the computation $$\tilde{a}(n) + j\tilde{b}(n) = [x(nT - NT) + jy(nT-NT)] e^{j\hat{f}_n}$$

where $\tilde{a}(n)$ and $\tilde{b}(n)$ are the corrected inphase and quadrature components. Expanding the right hand sides yields $$\tilde{a}(n) = x(nT-NT) \cos \hat{f}_n - y(nT-NT) \sin \hat{f}_n$$

and $$\tilde{b}(n) = x(nT-NT) \sin \hat{f}_n + y(nT-NT) \cos \hat{f}_n$$

These are the well known equations for rotating a point in two-dimensional space through an angle $\hat{f}_n$.

Figure 2:
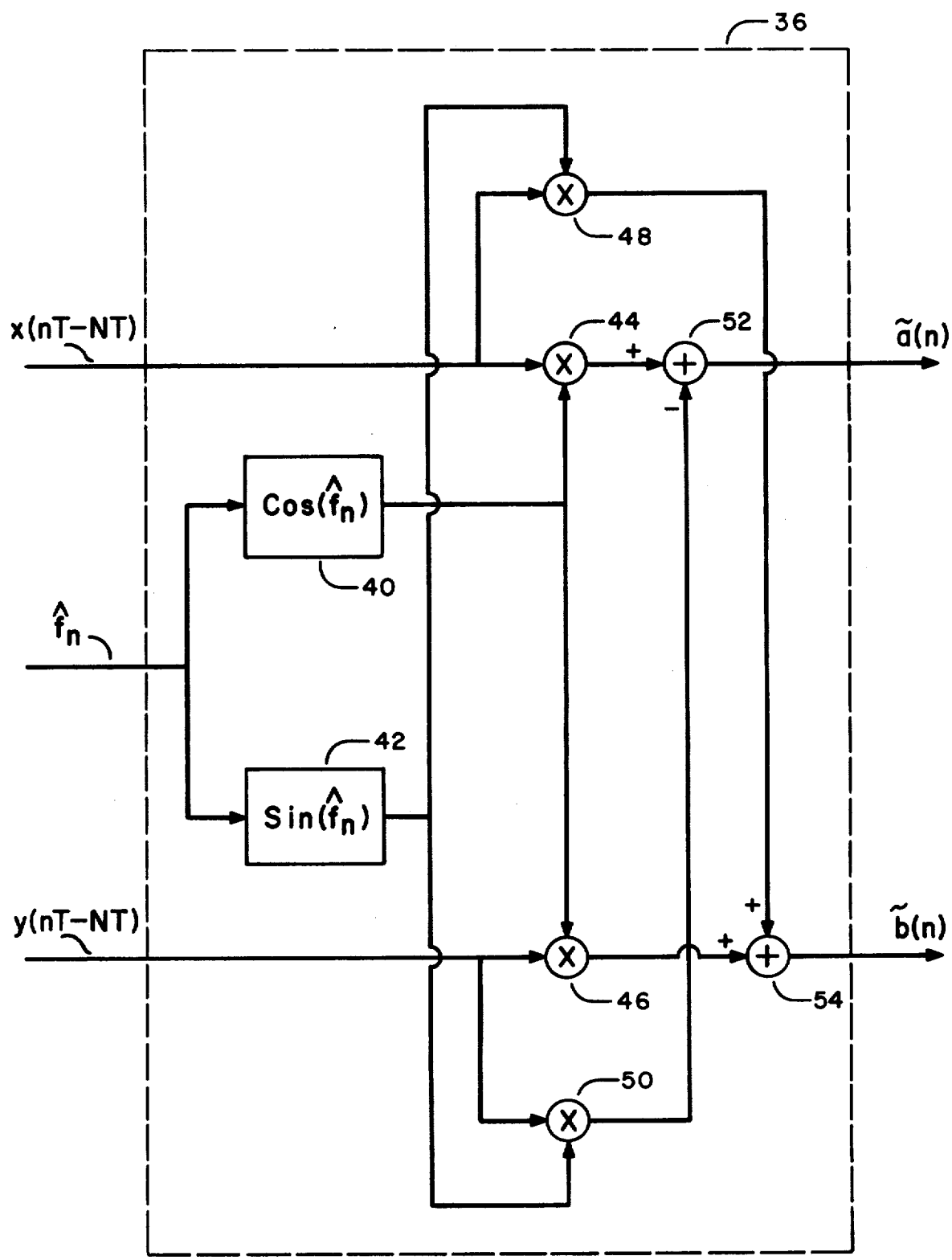
FIG. 2 is a schematic circuit diagram of the phase shifter of FIG. 1.

Referring to FIG. 2, a schematic circuit diagram of an exemplary embodiment of the phase shifter 36 of FIG. 1 is illustrated. The phase error signal $\hat{f}_n$ is applied to a pair of digital table "look-ups" 40 and 42 which produce outputs corresponding to $\cos(\hat{f}_n)$ and $\sin(\hat{f}_n)$, respectively, these circuits functioning simply to "look up" in a memory the cosine or sine of the phase error angle $\hat{f}_n$. The output of digital table look-up 40 is connected to a first pair of multipliers 44 and 46 which receives as a second input the $x(nT-NT)$ and $y(nT-NT)$ input signals, respectively. Similarly, the output of digital table look-up 42 is connected to a second pair of multipliers 48 and 50 which are respectively connected to receive the $x(nT-NT)$ and $y(nT-NT)$ inputs to phase shifter 36. The outputs of multipliers 46 and 48 are connected to the inputs of a first adder 54 while the outputs of multipliers 44 and 50 are connected to the inputs of a second adder 52. It will be appreciated that the circuitry illustrated performs the required mathematical manipulations and thus that the outputs of adders 52 and 54 are desired signals $\tilde{a}(n)$ and $\tilde{b}(n)$ as defined hereinabove.

It will be seen that if no additive noise were present in the channel, the bandwidth of the decision directed phase-locked loop, indicated within the dashed lines block A, could be increased so that the jitter corrector, indicated within dashed line block B, would not be required. However, in the presence of noise, the loop performs poorly because of the relatively wide bandwidth thereof. Thus, as stated hereinbefore, and as will be evident from the foregoing, the present invention concerns the use of a narrow band loop, as provided by loop filter 28, which is not affected by noise, in combination with the provision of jitter correction outside of the loop.

Although the invention has been described relative to examplary embodiments thereof, it will be understood that other variations and modifications can be effected in these embodiments without department from the scope and spirit of the invention.

I claim:

1. A QAM receiver system for correcting phase jitter and frequency offsets in a transmitted QAM signal, said system comprising a decision directed phase-locked loop for receiving the transmitted signal and for generating a phase error signal based on estimates of the transmitted symbols, and phase jitter correction means, located outside of said phase-locked loop and including a low pass filter for passing the expected jitter frequencies, for receiving the inphase and quadrature components of the transmitted signal and said phase error signal, and for correcting said inphase and quadrature components for phase jitter.

2. A system as claimed in claim 1 wherein said low pass filter comprises a low pass digital filter connected to receive said phase error signal, said phase jitter correction means further including delay means for delaying the inphase and quadrature components to match the delay of the digital filter, and phase shifter means connected to the outputs of said digital filter and said delay means for correcting the phase of said inphase and quadrature components by a rotational transformation.

3. A system as claimed in claim 2 wherein said phase shifter means comprises means for performing the computation $\tilde{a}(n) + j\tilde{b}(n) = [X(nt-NT) + j y$ $(nT-NT)]e^{j\hat{f}_n}$, Where $\hat{a}(n)$ and $\hat{b}(n)$ are the corrected inphase and quadrature components, $x(nT-NT)$ and $y(nT-NT)$ are the values of the inphase and quadrature components at the sample time $nT$, as delayed by said delay means, and $\hat{f}_n$ is the phase error signal after processing by said low pass digital filter.

4. A system as claimed in claim 1 wherein said phase locked loop includes symbol decision means for selecting the most likely transmitted symbol and generating corresponding inphase and quadrature signals $\hat{a}_n$ and $\hat{b}_n$, and a phase error generator for generating said phase error signal, said phase error generator receiving said $\hat{a}_n$ and $\hat{b}_n$ signals together with the inphase and quadrature signals sampled at the time $nT$, and computing an error signal $$\hat{f}_n = Imtus.5 \left\{ \frac{(\hat{a}_n + j\hat{b}_n) \overline{r(nT)}}{|(\hat{a}_n + j\hat{b}_n) \overline{r(nT)}|} \right\}$$

* * * * *